(12) United States Patent
Sadhankar

(10) Patent No.: US 11,487,515 B2
(45) Date of Patent: Nov. 1, 2022

(54) SYSTEM AND METHOD FOR AUTOMATED USER INTERFACE LAYOUT PRESENTATION BASED ON TASK

(71) Applicant: SHOPIFY INC., Ottawa (CA)

(72) Inventor: Aaron Sadhankar, Ottawa (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/087,720

(22) Filed: Nov. 3, 2020

(65) Prior Publication Data

US 2022/0137938 A1 May 5, 2022

(51) Int. Cl.
*G06F 11/34* (2006.01)
*G06F 8/38* (2018.01)
*G06Q 30/06* (2012.01)

(52) U.S. Cl.
CPC ............ *G06F 8/38* (2013.01); *G06F 11/3438* (2013.01); *G06Q 30/0641* (2013.01)

(58) Field of Classification Search
CPC .................................................... G06F 3/0481
See application file for complete search history.

(56) References Cited

U.S. PATENT DOCUMENTS

| 10,726,095 | B1 * | 7/2020 | Pallemulle | G06F 16/9535 |
| 2008/0010610 | A1 * | 1/2008 | Lim | H04M 1/72469 |
| | | | | 715/810 |
| 2014/0244622 | A1 * | 8/2014 | Lindsay | G06F 40/166 |
| | | | | 707/722 |
| 2016/0378642 | A1 * | 12/2016 | Adams | G06F 3/04842 |
| | | | | 717/125 |
| 2017/0032050 | A1 * | 2/2017 | Kol | G06F 40/106 |
| 2017/0277396 | A1 * | 9/2017 | Chung | G06F 9/451 |
| 2018/0121980 | A1 * | 5/2018 | Blass | G06Q 10/087 |
| 2018/0267813 | A1 * | 9/2018 | Bandi | G06F 16/972 |
| 2019/0361579 | A1 * | 11/2019 | Srivastava | A61B 5/746 |
| 2020/0349482 | A1 * | 11/2020 | Grossman | G06F 30/12 |

* cited by examiner

*Primary Examiner* — Di Xiao

(57) ABSTRACT

A system and method to assist in repetitively performing a task within an application/system is provided. Tracking information, in terms of how a user interacts with the application/system is stored. The tracking information includes a series of navigation actions the user takes to perform a task, and includes a sequence of user interface layouts presented in the course of performing the task. Based on the stored tracking information, a task-centric user interface layout is determined, and this is presented to the user in response to the user performing one of the navigation actions within the sequence of interface layouts. This saves the user from having to execute the series of navigation actions each time the user is to perform the task.

16 Claims, 14 Drawing Sheets

| Store name | Admin – Orders | (un) username |

Home
Orders (17)
Products
...
...
Settings

| | | Status ∨ | Date ∨ | ... | ... | More filters | ↕ Sort |
|---|---|---|---|---|---|---|---|
| All [Unfulfilled] Unpaid ... | | | | | | | |
| 🔍 | | | | | | | |
| #1001 | 2020/05/29 | Sarah | $100.00 | Paid | | Unfulfilled 3 items | |
| #1002 | 2020/06/01 | Rick | $199.99 | Paid | | Unfulfilled 2 items | |
| ... | ... | ... | ... | ... | | ... | |
| #1015 | 2020/06/11 | Lisa | $100.00 | Paid | | Unfulfilled 3 items | |
| #1016 | 2020/06/12 | Jim | $49.99 | Unpaid | | Unfulfilled 1 items | |

SYSTEM AND METHOD FOR AUTOMATED USER INTERFACE LAYOUT PRESENTATION BASED ON TASK

FIELD

The application relates to task execution in an application, such as an E-commerce application, and more specifically to user interface layouts used for task execution.

BACKGROUND

In an E-commerce system, it is common to employ performance metrics that are related to speed of execution. The ability to quickly access intended objects in an interaction will have a direct effect on speed of execution. In a specific example, when processing orders, the presentation of user interface layouts for orders is important. However existing systems typically use a pre-defined default view.

However, a given user may interact with the system in a manner that is not most efficiently achieved by the single default layout. A user interacting with the system to perform a particular task, presented with the default layout, may need to take a number of steps to configure the layout to be suitable for that task. Other users performing the same task may need to take the same steps. The same user interacting with the system to perform a different task may need to take other steps to configure the layout to be suitable for that other task.

For the purpose of this description, interactions with user interface layouts provided by an application can be divided into two types. The first type of interaction is referred to herein as a navigation action. A navigation action has an effect on what is displayed, for example in terms of navigating to a different user interface layout, but does not have an effect on stored application data. The second type of interaction is referred to herein as a task. Performance of a task does have an effect on stored application data and may for example, involve data entry or setting or changing a state. Performance of a task may also have an effect on what is displayed. In some systems, a user may need to perform multiple navigations actions to get to the point where they can perform the desired task. When the user is performing the same task repeatedly, performing these multiple navigation actions is repetitive and time consuming.

SUMMARY

Methods and systems are provided that reduce the need for a user to manually access the appropriate user interface layout to perform a task. These can be used, for example, to provide a more effective presentation of an E-commerce user interface layout, such as a merchant's order user interface layout. Conveniently, in this way, speed of execution of tasks may be improved. While the focus of the described embodiments is on an order user interface layout within an E-commerce platform, the approaches described here have broader application, for example, to other user interfaces within an E-commerce system such as user interfaces for managing inventory. The methods may alternatively be applied to E-commerce tasks generally. Furthermore, the approaches maybe applied in context other than E-commerce systems, particularly systems that involve repetitive actions/tasks being performed by a user from user interfaces provided by the system.

In the order user interface layout example, an order user interface layout is presented in a manner that is dynamically dependent on the context of interactions of a user. A user accessing the system to perform a particular task is presented with a task-centric order user interface layout. The task-centric order user interface layout is determined based on previous interactions with the system by the user in performing the particular task and/or previous interactions with the system by other users in performing the particular task. Similarly, the same user accessing the system to perform another particular task is presented with another task-centric order user interface layout based on previous interactions with the system.

To achieve this, the system tracks tasks performed on a user interface layout (for example an order user interface layout) and tracks the user interface layouts/presentation and navigation actions used to perform the tasks. This is stored as tracking information.

The tracking information associates a sequence of user interface layouts and navigation actions with the performed task of a user. The tracking information may show a different sequence of user interface layouts for different tasks performed by the same user. The tracking information may be limited to a single user, or aggregated across multiple users.

The tracking information is used to determine a task-centric default order user interface layout for that task that is presented to the user under certain circumstances.

According to one aspect of the present invention, there is provided a method comprising: tracking a sequence of user interface layouts presented in the course of a first user performing a task, and creating an association between the sequence of user interface layouts and detected navigation actions taken by the first user within those user interface layouts, and storing the association in a database; determining, based on the stored associations, a task-centric user interface layout for the first user, the task-centric user interface layout intended to ease performance of the task; and in response to detecting a navigation action associated with the first user within a user interface layout of the sequence of user interface layouts, providing the respective task-centric user interface layout for display.

Optionally, determining the task-centric user interface layout for the given user is based only on the stored associations for that user.

Optionally, the method further comprises: for each of at least one other user, tracking a sequence of user interface layouts presented in advance of the other user performing the task, and creating an association between the sequence of layouts and detected navigation actions taken by the other user within those user interface layouts, and storing the association in a database; wherein the determining the task-centric user interface layout for the first user is based on the stored associations for a set of users including the first user and the at least one other user.

Optionally, the set of users is defined based on one of or a combination of two or more of: organization; role; a field functioning as an aggregation tag; or location.

Optionally, determining, based on the stored associations, a task-centric user interface layout for the first user, the task-centric user interface layout intended to ease performance of the task is based on probabilities determined from the stored associations.

Optionally, determining, based on the stored associations, a task-centric user interface layout for the first user, the task-centric user interface layout intended to ease performance of the task, based on probabilities determined from the stored associations, comprises: based on the stored associations, for each detected action taken by the first user within a user interface layout of said sequence of user interface layouts, determining a probability that the first user will navigate to each other user interface layout of said sequence of user interface layouts; determining the task-centric user interface layout based on the probabilities.

Optionally, the method further comprises: based on the stored associations, for each detected action taken by the first user within said sequence of user interface layouts, determining a respective probability that the first user will navigate to a specific user interface layout within which the task can be performed; for each detected action taken by the first user within said sequence of user interface layouts, determining the task-specific user interface layout to be the specific user interface layout within which the task can be performed when the respective probability is greater than a threshold.

Optionally, the task is a task within an E-commerce platform.

According to another aspect of the present invention, there is provided an apparatus comprising: a processor and a memory, the apparatus configured to perform a method comprising: tracking a sequence of user interface layouts presented in the course of a first user performing a task, and creating an association between the sequence of user interface layouts and detected navigation actions taken by the first user within those user interface layouts, and storing the association in a database; determining, based on the stored associations, a task-centric user interface layout for the first user, the task-centric user interface layout intended to ease performance of the task; and in response to detecting a navigation action associated with the first user within a user interface layout of the sequence of user interface layouts, providing the respective task-centric user interface layout for display.

Optionally, the apparatus is configured to determine the task-centric user interface layout for the given user based only on the stored associations for that user.

Optionally, the apparatus is further configured to: for each of at least one other user, tracking a sequence of user interface layouts presented in advance of the other user performing the task, and creating an association between the sequence of layouts and detected navigation actions taken by the other user within those user interface layouts, and storing the association in a database; wherein the apparatus is configured to determine the task-centric user interface layout for the first user based on the stored associations for a set of users including the first user and the at least one other user.

Optionally, the set of users is defined based on one or a combination of: organization; role; a field functioning as an aggregation tag; or location.

Optionally, the apparatus is configured to determine, based on the stored associations, a task-centric user interface layout for the first user, the task-centric user interface layout intended to ease performance of the task, based on probabilities determined from the stored associations.

Optionally, the apparatus is configured to determine, based on the stored associations, a task-centric user interface layout for the first user, the task-centric user interface layout intended to ease performance of the task, based on probabilities determined from the stored associations, by: based on the stored associations, for each detected action taken by the first user within a user interface layout of said sequence of user interface layouts, determining a probability that the first user will navigate to each other user interface layout of said sequence of user interface layouts; determining the task-centric user interface layout based on the probabilities.

Optionally, the apparatus is further configured to: based on the stored associations, for each detected action taken by the first user within said sequence of user interface layouts, determining a respective probability that the first user will navigate to a specific user interface layout within which the task can be performed; for each detected action taken by the first user within said sequence of user interface layouts, determining the task-specific user interface layout to be the specific user interface layout within which the task can be performed when the respective probability is greater than a threshold.

Optionally, the apparatus is implemented within an E-commerce platform.

According to another aspect of the present invention, there is provided a computer readable medium having computer executable instructions stored thereon that when executed by a computer cause the computer to perform a method comprising: tracking a sequence of user interface layouts presented in the course of a first user performing a task, and creating an association between the sequence of user interface layouts and detected navigation actions taken by the first user within those user interface layouts, and storing the association in a database; determining, based on the stored associations, a task-centric user interface layout for the first user, the task-centric user interface layout intended to ease performance of the task; and in response to detecting a navigation action associated with the first user within a user interface layout of the sequence of user interface layouts, providing the respective task-centric user interface layout for display.

Optionally, determining the task-centric user interface layout for the given user is based only on the stored associations for that user.

Optionally, the method further comprises: for each of at least one other user, tracking a sequence of user interface layouts presented in advance of the other user performing the task, and creating an association between the sequence of layouts and detected navigation actions taken by the other user within those user interface layouts, and storing the association in a database; wherein the determining the task-centric user interface layout for the first user is based on the stored associations for a set of users including the first user and the at least one other user.

Optionally, the set of users is defined based on one or a combination of: organization; role; a field functioning as an aggregation tag; or location.

BRIEF DESCRIPTION OF THE DRAWINGS

Embodiments of the disclosure will now be described with reference to the attached drawings in which:

FIGS. 3A-3J are examples of graphical user interface layouts including task-centric user interface layouts;

FIG. 5 is an example of a home user interface layout of a merchant, according to one embodiment.

DETAILED DESCRIPTION

The operation of the current example embodiments and the structure thereof are discussed in detail below. It should be appreciated, however, that the present disclosure provides many applicable inventive concepts that can be embodied in any of a wide variety of centric contexts. The centric embodiments discussed are merely illustrative of centric structures of the disclosure and ways to operate the disclosure, and do not limit the scope of the present disclosure.

Figure 1:
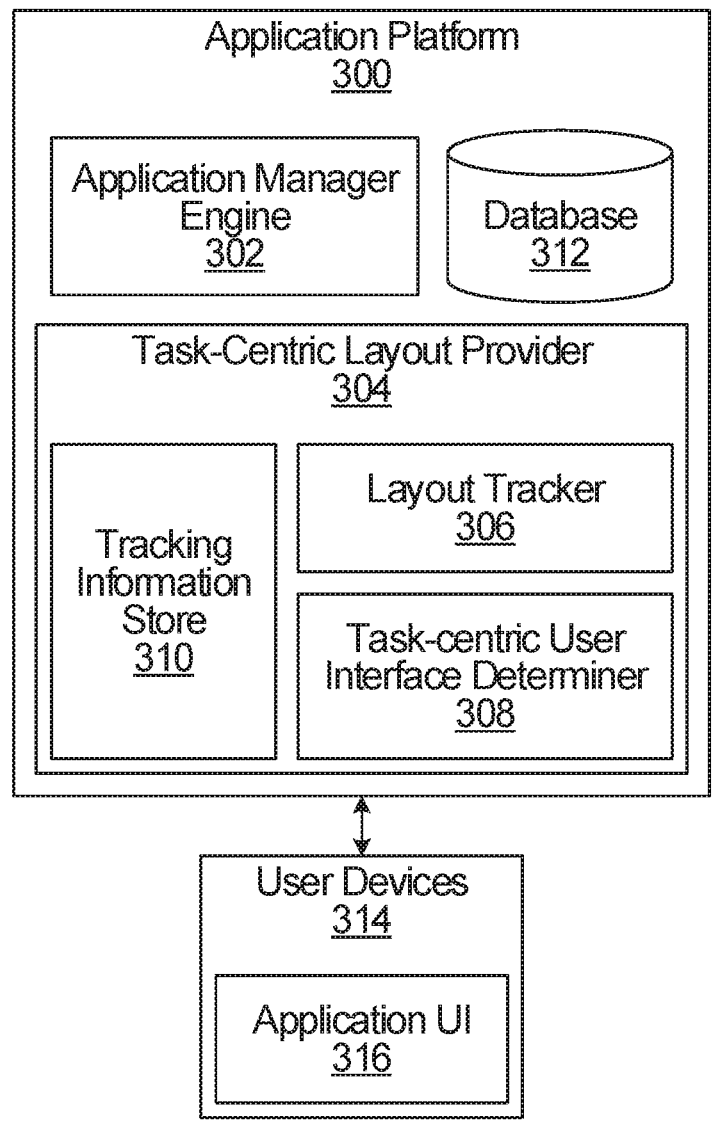
FIG. 1 is a block diagram of an application platform with automated presentation of task-centric user interface layouts based on prior user behaviour.

Quick access to the relevant user interface layout for performing a task, such as a task in an E-commerce system, can save time for a user. A block diagram of an application platform that provides task-centric user interface layouts is depicted in FIG. 1. The application platform, generally indicated at 300, may be an e-commerce platform, or a platform for another type of application. The application platform 300 has an application management engine 302, which performs the main application management functions for the application executed on the application platform 300. The application management engine 302 might be a commerce engine for the e-commerce platform example.

Shown is a task-centric user interface layout provider 304 which has a layout tracker 306, a task-centric user interface layout determiner 308, and tracking information store 310. The layout tracker 306 tracks user interactions with the application management engine, in terms of navigation actions taken, tasks performed, and user interface layouts presented, and stores tracking information in the tracking information store 310. The task-centric user interface layout determiner 308 uses the tracking information to determine a task-centric user interface layout to present to a user. The operation of the task-centric user interface layout provider 304 is described in detail below. The task centric layout provider 304 may, for example, be implemented in dedicated hardware, or in a processor executing computer executable code stored on a storage medium. In some embodiments, the functionality of the task centric layout provider 304 is integrated within the application management engine 302.

User devices are indicated at 310. In practice there may be multiple user devices, and the user devices may have one or multiple types. For example, in the E-commerce example, the user devices may include customer devices and merchant devices. The user devices 310 may include devices connected directly to the application platform 300, and/or devices connected via one or more intervening networks, such as a LAN, WAN or the internet to name a few centric examples.

The user devices 310 interact with the application platform 300 via an application user interface layout that may be provided by the application platform and/or by a client application running on the user devices. In the illustrated example, one of the user devices 310 is depicted with an application UI 312 of a client application running on the user device 310.

In operation, using a user device 312, a user interacts with the application platform via user interface layouts, and performs navigation actions and tasks. The user operating the user device 312 may need to take multiple navigation actions in multiple user interface layouts before reaching a user interface layout within which they can perform a task, which may for example, be a specific data entry task. The application management engine 302 presents the user interface layouts to the user on the user device 312 based on the navigation actions taken by the user, and ultimately, the user can perform the task.

The layout tracker 306 tracks the behaviour of the user in performing the task. More centrically, the layout tracker 306 tracks a sequence of user interface layouts presented in the course of the user performing a task, typically in response to detected navigation actions, and creates an association between the sequence of user interface layouts and the detected navigation actions taken by the user within those user interface layouts. This association is stored in the tracking information store 310. Of course, before the task is actually executed, it is not known with certainty that the sequence of user interface layouts is "in the course of the user performing a task". However, this can be determined after the fact.

The task-centric user interface layout determiner 308 determines, based on the stored associations, one or more task-centric user interface layouts for the user that is presented on the user device in certain circumstances. A task-centric user interface layout is intended to ease performance of the task. Then, in response to detecting a navigation action associated with the user within a user interface layout of the sequence of user interface layouts, a task-centric user interface layout is provided for display on the user device 310. A navigation action may be associated with a user when it is performed on a user device using login credentials of the user.

A user may use different user devices, and their actions on these different devices are still associated with the same user.

In some embodiments, the task-centric user interface layout for a given user is based only on the stored associations for that user. In other embodiments, the associations are stored for a set of users, including the user and at least one other user, and the task-centric user interface layout for the user is based on the stored associations for the set of users.

In some embodiments, based on the stored associations, for each detected action taken by the user (or set of users) within a user interface layout of the sequence of user interface layouts, a probability that the user (or set of users) will navigate to each other user interface layout of the sequence of user interface layouts is determined. Then, the task-centric user interface layout is determined based on these probabilities.

In some cases, the task-centric user interface layout is one of the sequence of layouts. Ideally, in order to save the user as many steps as possible, the task-centric user interface layout is the layout within which the user can perform the task directly. For example, if a user is taking a sequence of navigation actions to get to a layout to perform a data entry task, the best case scenario is that the task-centric user interface layout is the layout to perform the data entry task. However, the task-centric user interface layout may be different for different detected actions, based on the determined probabilities and/or a task-centric user interface layout may be defined for one detected action but not for another.

In some embodiments, a layout within which to perform the task is set as the task-centric user interface layout to present in response to a detected action in one of the sequence of layouts if the stored associations show a high enough probability based on stored tracking information, for example greater than a threshold, that the detected action is a precursor to ultimately performing the task in that layout.

Consider the following scenario concerning two detected actions. Following a first detected action within one of the sequence of user interface layouts, there may be a first probability that the user will navigate to a specific layout to perform a data entry task and a second probability that the user will navigate to some other user interface layout without performing the data entry task. Similarly, for a second detected action within one of the sequence of user interface layouts, there may be a third probability that the user will navigate to the specific layout to perform the data entry task and a fourth probability that the user will navigate to some other user interface layout without performing the task. For our example, for the first detected action, the stored associations and computed probabilities show that the first probability is greater than a defined threshold, and therefore the layout to perform data entry task is set as the task-centric user interface layout that is presented when the user takes the first detected action. For the second detected action, stored associations and computed probabilities show that the third probability is lower than a defined threshold, so the layout to perform data entry task is not set as the task-centric user interface layout that is presented when the user next takes the second detected action.

In some embodiments, following or during an initial training phase, the tracking information is processed offline to identify task-centric user interface layouts. This processing is used to identify what to display to a user in response to detected actions that will reflect the prior behaviour and help with the efficiency in executing tasks.

In other embodiments, after an initial training phase, the tracking information is processed after receipt of a detected action to determine whether to display a task-centric user interface layout, and to determine what that layout is. This approach ensures that the task-centric user interface is most up to date in terms of reflecting prior user behaviour In either case, the tracking information store 310 is still updated following the initial training phase. The initial training phase may last for a fixed period of time, or for as long as necessary to accumulate a sufficient amount of tracking information in the tracking information store 308 to be considered a reliable indicator of user behaviour. The training phase may have a different duration for different tasks.

When considering the tracking information, the system may emphasize tracking information pertaining to more recent interactions more strongly than interactions received in the distant past.

Figure 2:
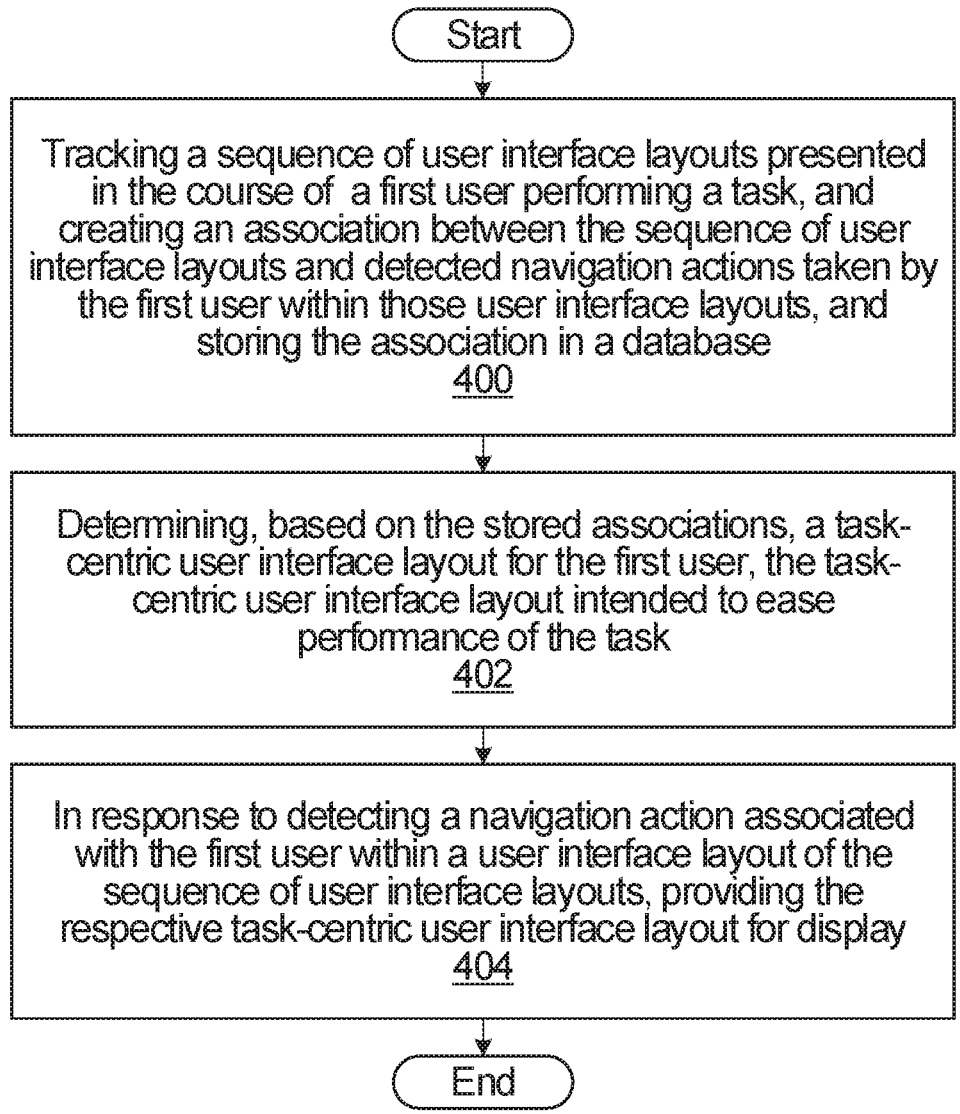
FIG. 2 is a flowchart of a method of automated presentation of task-centric user interface layouts based on prior user behaviour.

Referring now to FIG. 2, shown is a flowchart of a method of presenting a task-centric user interface. The method begins with block 400, which involves tracking a sequence of user interface layouts presented in the course of a first user performing a task, and creating an association between the sequence of user interface layouts and detected navigation actions taken by the first user within those user interface layouts, and storing the association in a database. The method continues in block 402 which involves determining, based on the stored associations, a task-centric user interface layout for the first user, the task-centric user interface layout intended to ease performance of the task. The method continues in block 404 which involves, in response to detecting a navigation action associated with the first user within a user interface layout of the sequence of user interface layouts, providing the respective task-centric user interface layout for display.

Detailed Example: Fulfilment Process

A detailed example relating to a fulfilment process will now be described. A user performing a fulfillment task may access an order summary user interface layout containing a list of orders. The first thing the user does is filter the tasks by "unfulfilled" as the user is interested in unfulfilled tasks. This is a navigation action, as it does not affect stored application data. Once filtered by unfulfilled, the user next sorts by date such that the oldest unfulfilled order appears in the list first. This is another navigation action. When the user selects a particular order from within the list of orders, a user interface layout for the particular order opens up. This is another navigation action. The user then selects "fulfil" and the system presents a user interface layout showing a set of fulfilment options that are available. This is another navigation action. When the user selects one of the fulfilment options, that selection has an effect on stored application data, and this step is therefore considered a task. It can be seen that the user must perform many navigation actions before getting to the user interface layout showing the set of fulfilment options, within which the user can execute the fulfilment task.

This workflow is not hardcoded into the system, but a user may consistently perform fulfilment using this sequence of steps. Other users may perform similar steps.

Figure 3A:
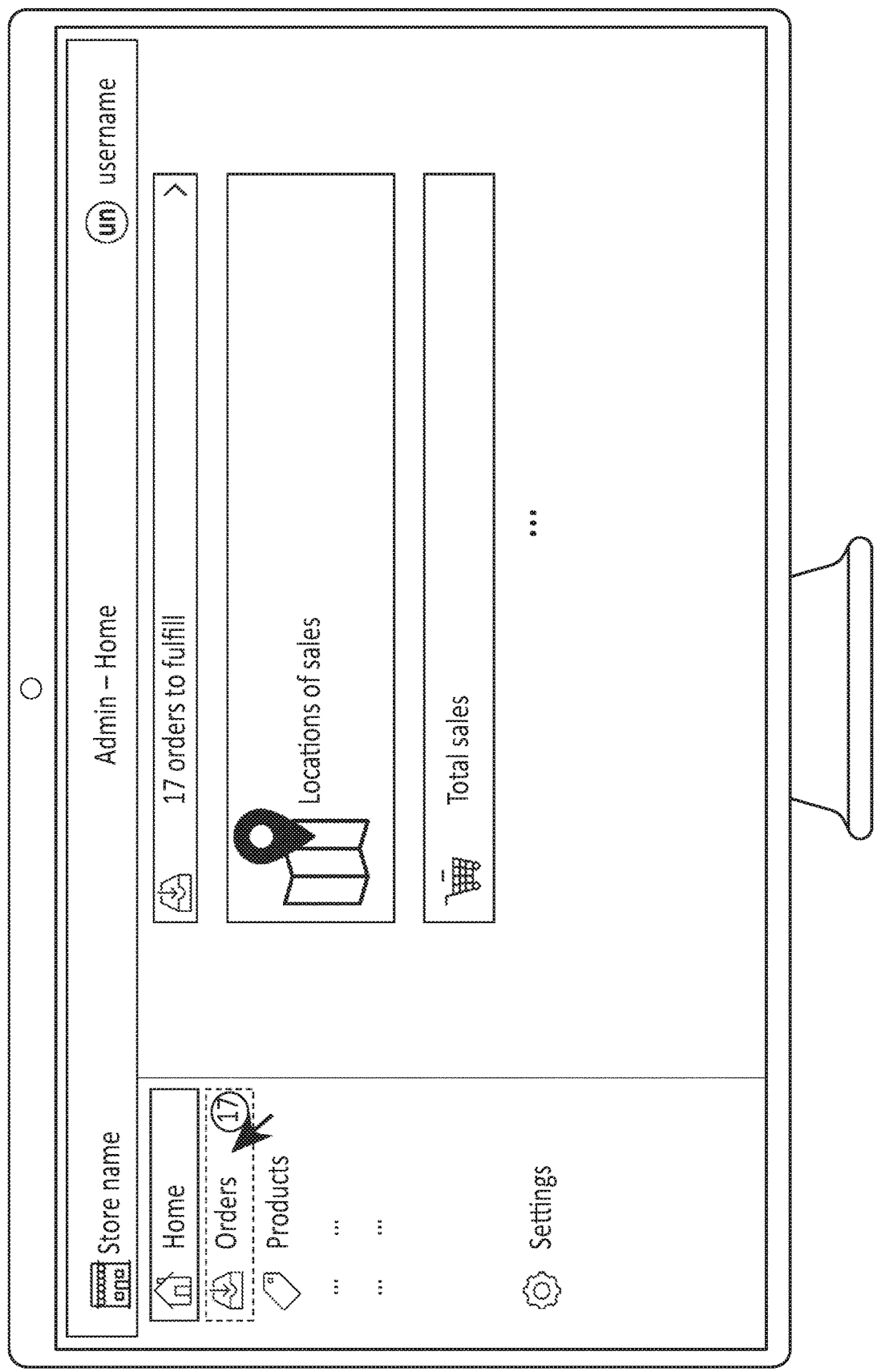

A specific example of a sequence of layouts leading up to completion of a fulfilment task is depicted in FIGS. 3A to 3H. For the user interfaces depicted in FIG. 3A to 3H, no task specific user interface layouts have yet been generated. FIG. 3A shows a user interface layout for a landing page for administration. The landing page shows a store name, page title "Admin—Home"—and user name "user name" of the individual logged in. The column on the left of the user interface layout has various selectable actions including "home" which will return to the administrative landing page, "orders" for navigating to a list of orders to fulfil, "products" for reviewing products available in the store. A setting icon allows a user to modify settings within the store. Also shown are various summary information, including the number of orders to fulfil "17 orders to fulfil", graphics indicating the location of sales, and an indication of total sales. For this example, the user selects the "orders" option from the left hand column.

Figure 3B:
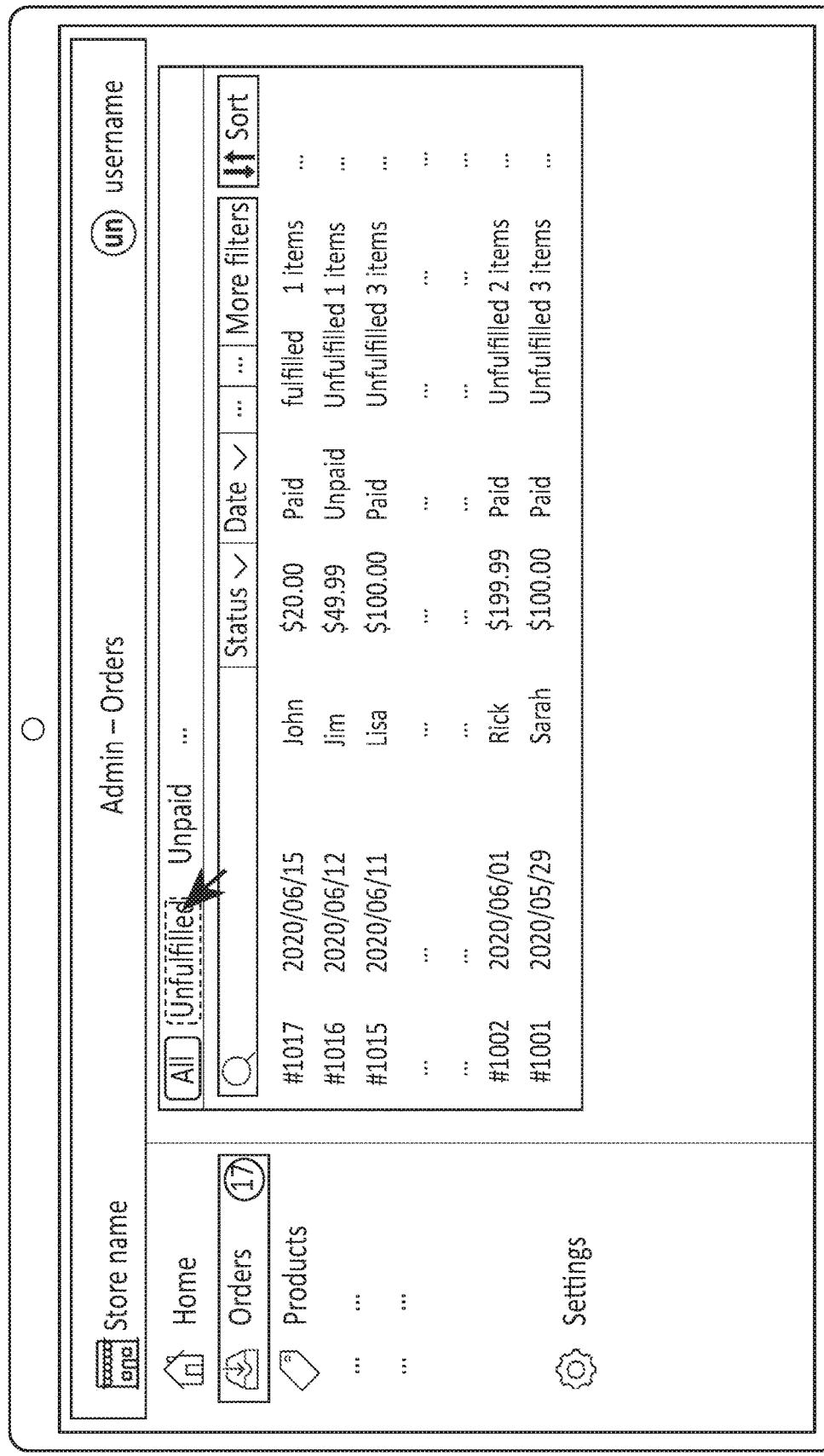
Figure 3C:
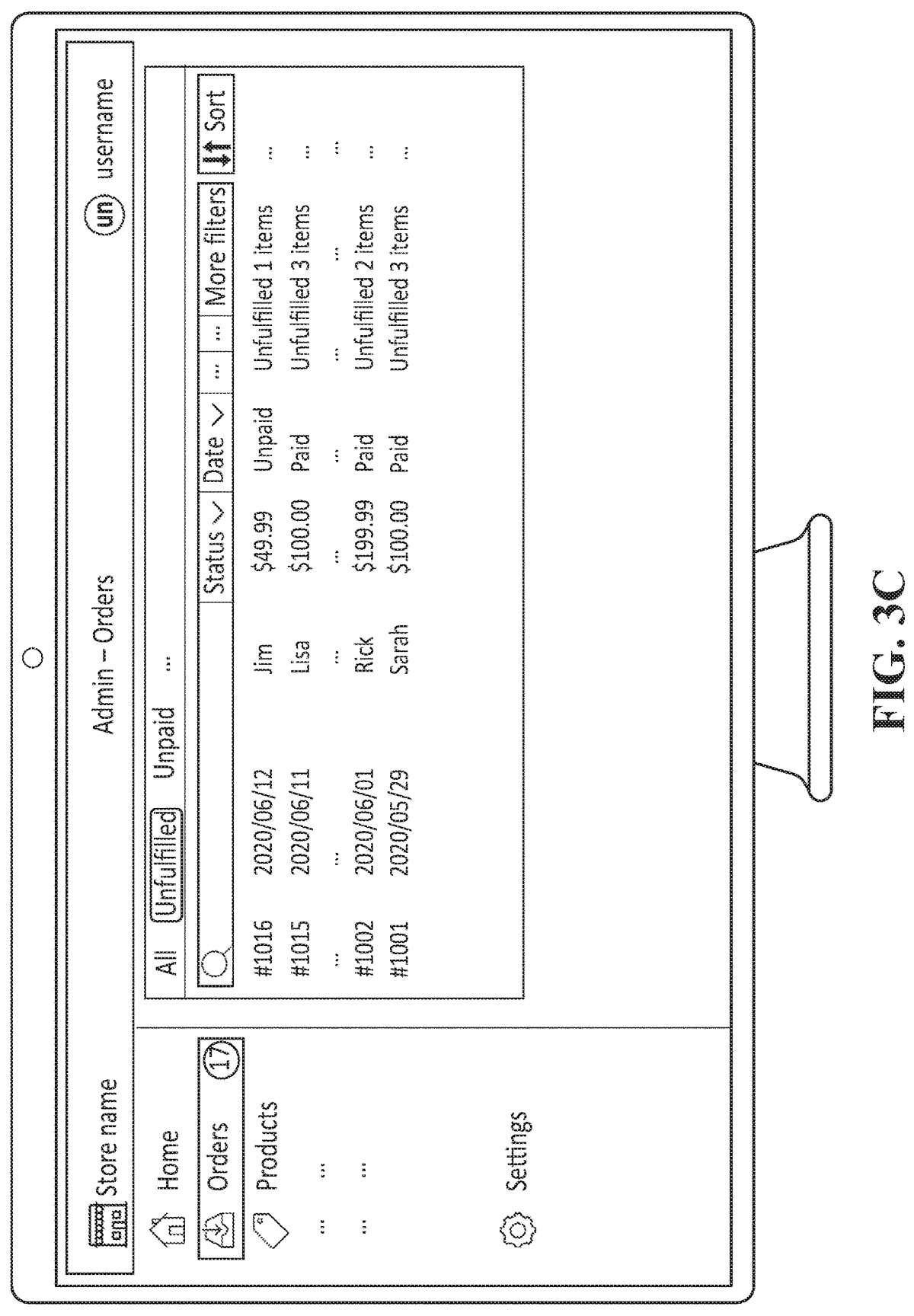

FIG. 3B shows a list of orders is displayed responsive to the previous navigation action. In the illustrated example, each order has an order number, a date, a salesperson's name, an amount, a paid status (paid/unpaid), a fulfilled status (fulfilled, unfulfilled), and number of items. There may be additional fields, not shown. Various sort options are shown including "status" (referring to fulfillment status), "date" as two specific examples. Also shown is an "unfulfilled" icon for causing only unfulfilled orders to be displayed (equivalent to filtering by "unfulfilled), and an "unpaid" icon for causing only unpaid orders to be displayed. In the illustrated example, the user has performed the navigation action to filter the orders by "unfulfilled". In response, the system displays orders filtered by unfulfilled as shown in FIG. 3C.

Figure 3D:
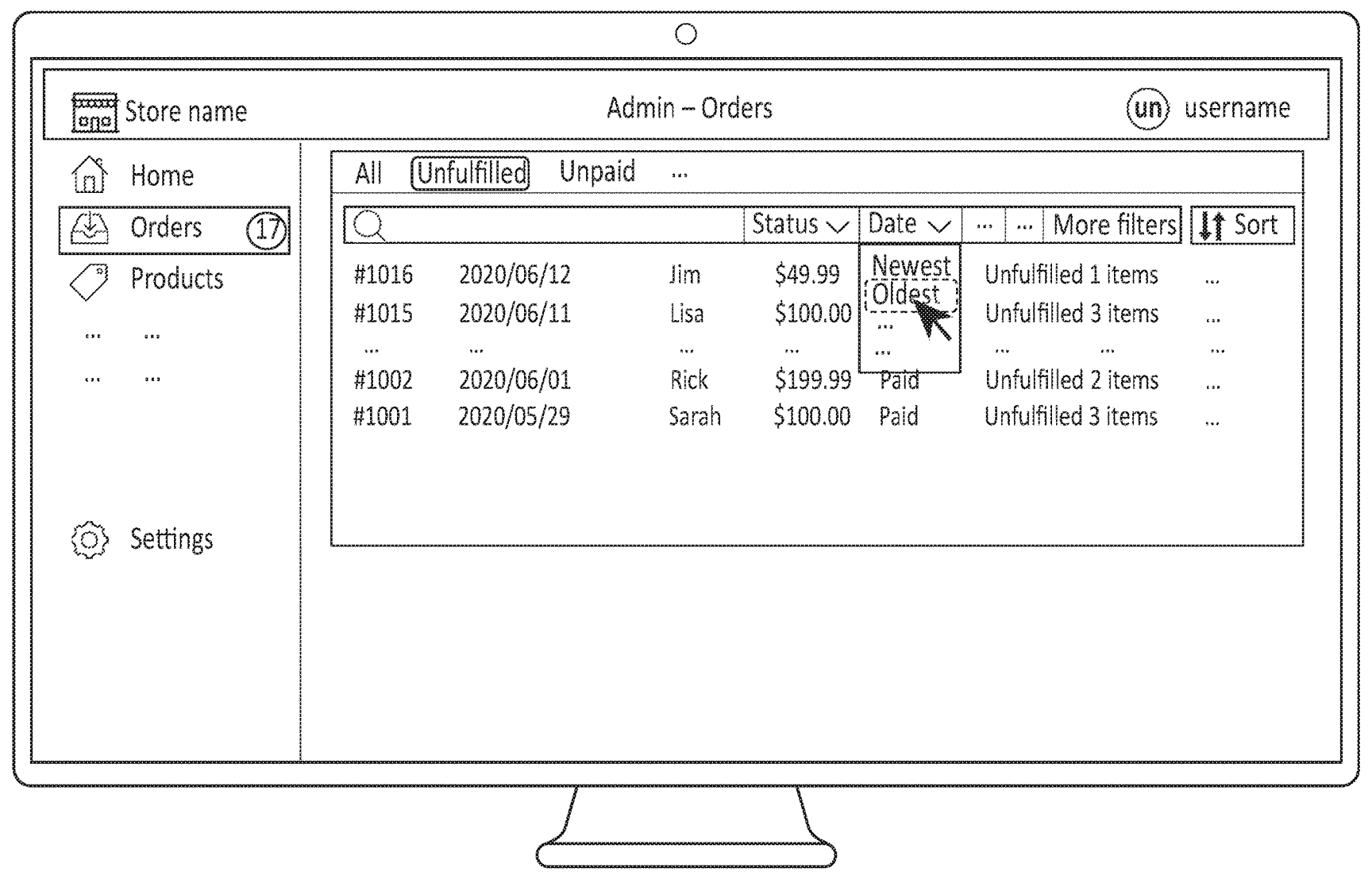

Next, as shown in FIG. 3D, the user performs a navigation action to sort by date, oldest to newest. In response, the system displays the list of orders, sorted by date, oldest to newest, as shown in FIG. 3E.

Figure 3F:
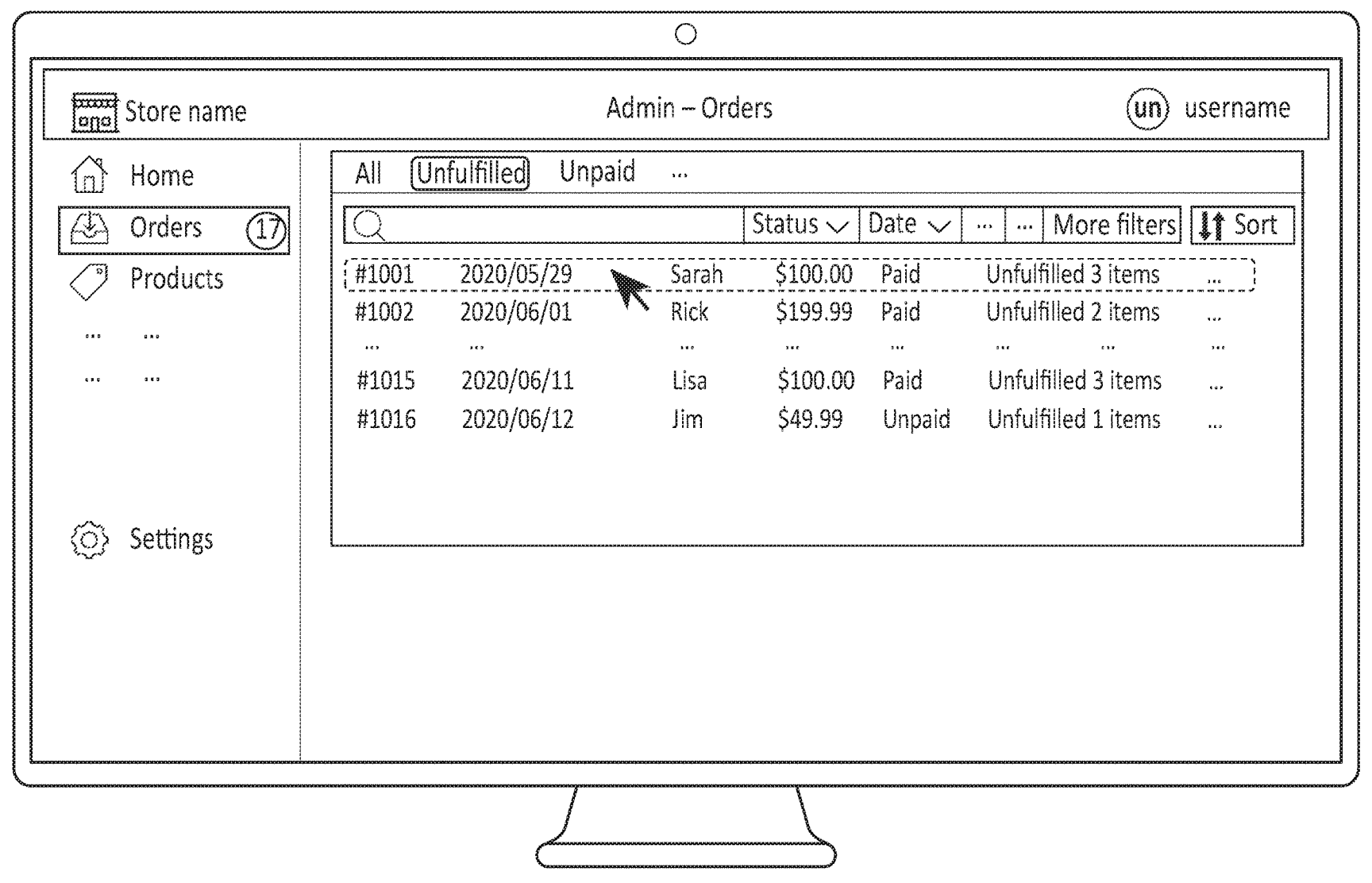
Figure 3G:
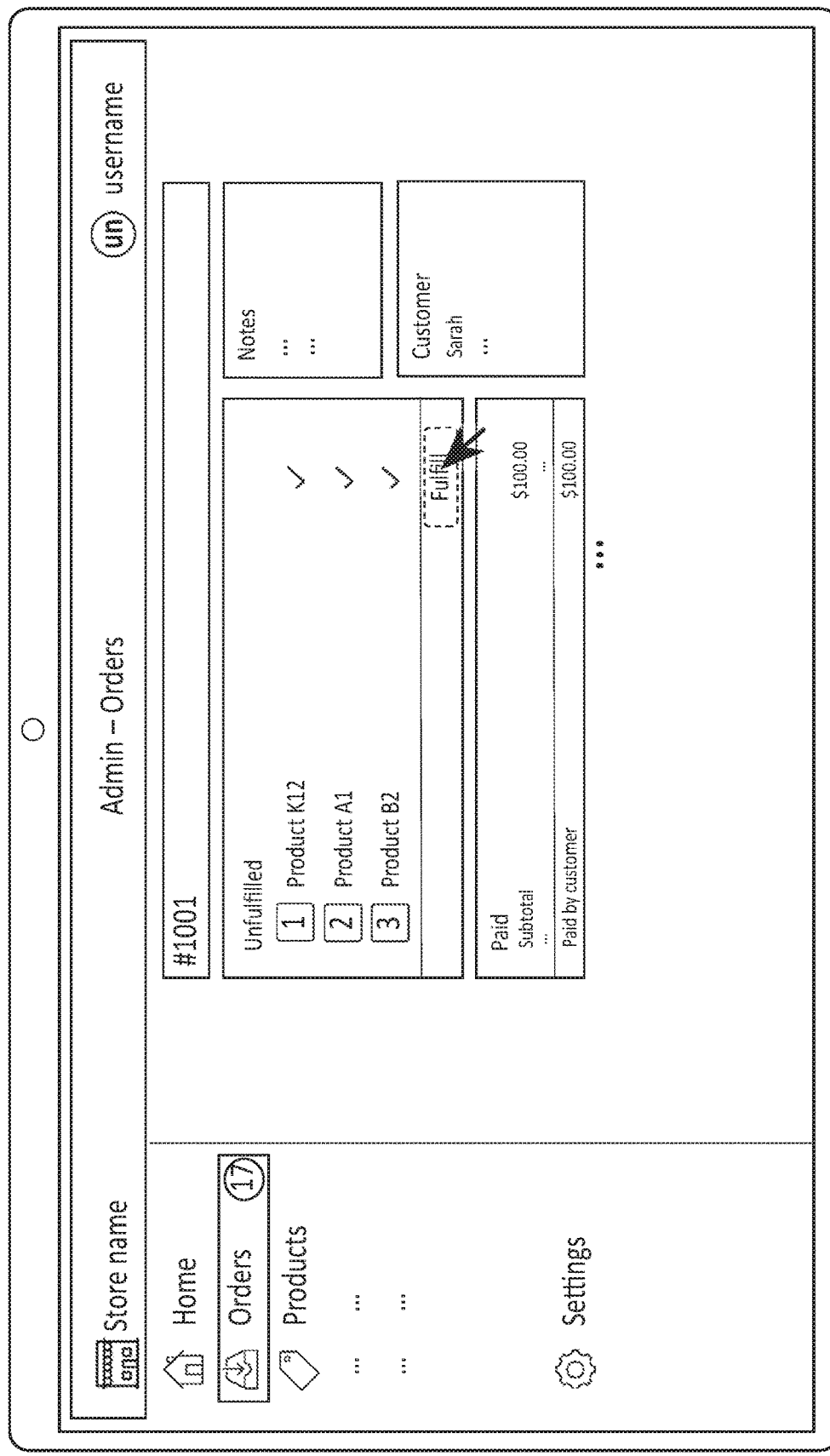

Next, as shown in FIG. 3F, the user performs a navigation action to select the first order in the list, which is the oldest unfulfilled order in the list. The result is shown in FIG. 3G, which shows an order user interface layout for the selected order which is the oldest unfulfilled order. From within that user interface layout, the user has performed the next navigation action by selecting "fulfil".

Figure 3H:
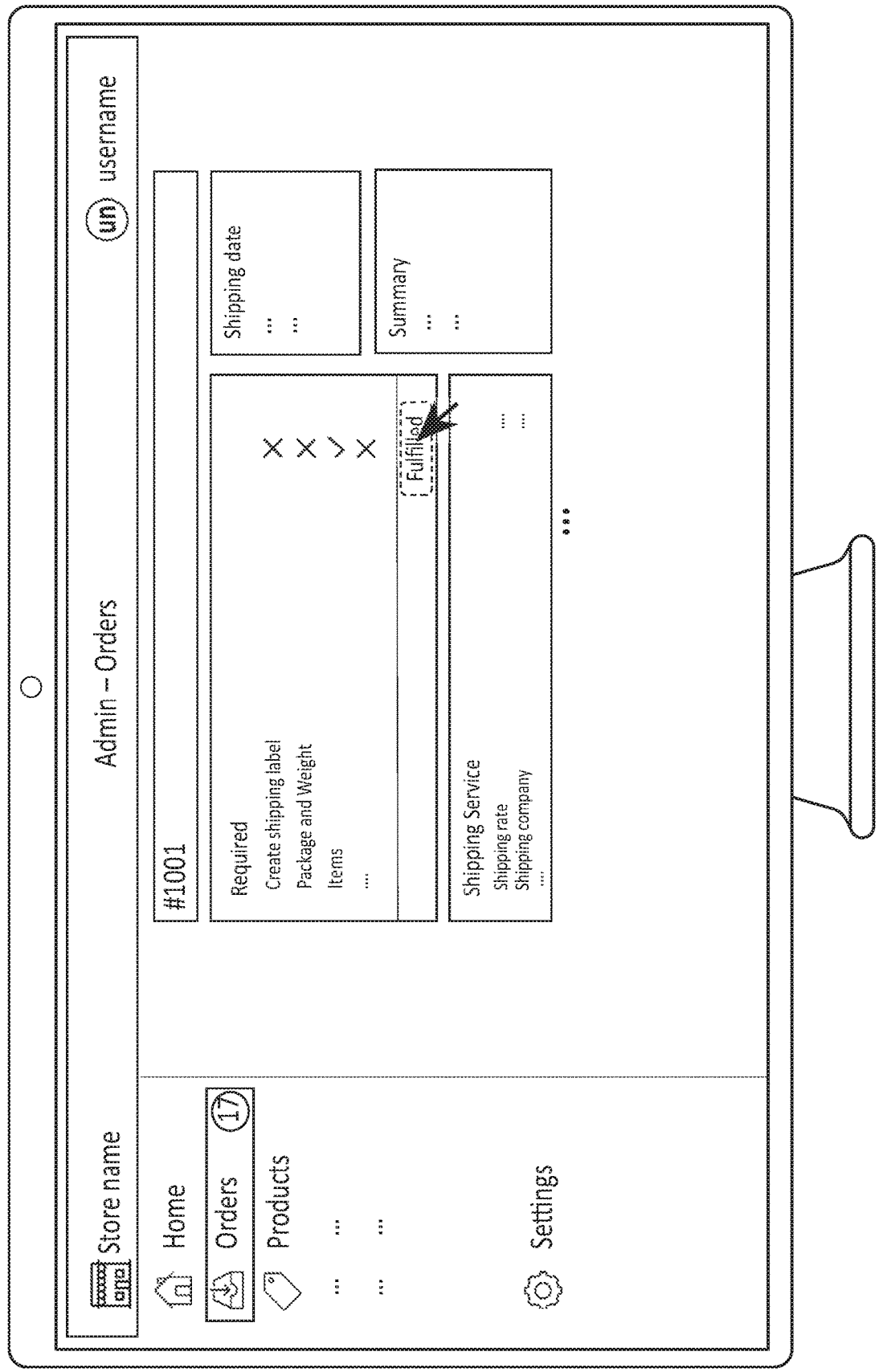

Next, in response to the user selection of "fulfil" in FIG. 3G, the system displays a fulfilment user interface layout, including fulfilment steps, as shown in FIG. 3H. FIG. 3H shows an examples set of fulfilment steps including "create shipping label", "package and weight", "items". In the illustrated example, the user selects "fulfilled" from within the user interface layout of FIG. 3H to execute the fulfilment task.

The sequence of layouts and navigation actions described above is one example of how the user may end up completing the fulfilment task. The system tracks this information for multiple interactions involving the user (or users) in performing the task and stores this as tracking information in the tracking information store 310. Of course, where the same user performs multiple tasks, the same steps can be performed for each of the tasks.

Such tracking information is stored in the tracking information store for multiple interactions of users with the system. The tracking information is processed to determine one or more task-centric user interface layouts to present in response to detected navigation actions.

Continuing with the fulfilment example, in a first possible outcome, based on the stored tracking information, the task-centric user interface determiner 308 determines a task-centric user interface layout for the navigation action "click on orders to fulfil" from within the landing user interface layout to be the user interface layout that displays the unfulfilled orders sorted by date oldest to newest.

The tracking information store 310 is updated with the navigation actions taken by the user for the various displayed user interface layouts. This will be done over time for multiple interactions with the system. The set of user interface layouts of FIGS. 3A to 3H is a very specific example of a user's interactions with the system.

The tracking information is then used to determine and present task-centric user interface layouts. The specific task-centric user interface layout displayed will of course depend on the stored tracking information, and as such will vary depending on prior actions by the user.

Figure 3I:

The tracking information is processed by the task-centric user interface determiner 308 to determine what task specific user interface layouts to display. Examples of how the processing may be performed based on probabilities are given below. As mentioned above, this can be done a priori as a background task, or in response to a further navigation action by a user. In a first example, the processing of the tracking information is such that it is determined that when a user selects "orders" in the side bar, a task specific user interface layout should be displayed that displays orders filtered by "unfulfilled" and sorted by date oldest to newest. The result is shown in FIG. 3I, which shows that at a later time, the user has accessed the user interface layout containing the list of orders, (layout=landing user interface layout; navigation action=click on orders to fulfil in sidebar), and in response to this, the system presents the task-centric user interface layout, which for this example is the user interface layout displaying orders filtered by "unfulfilled" and sorted by date oldest to newest.

In this case, it can be seen that the following steps are saved as a result of presenting the task-specific user interface layout:
  Filter by "unfulfilled"; and
  Sort by date oldest to newest.

Figure 3J:
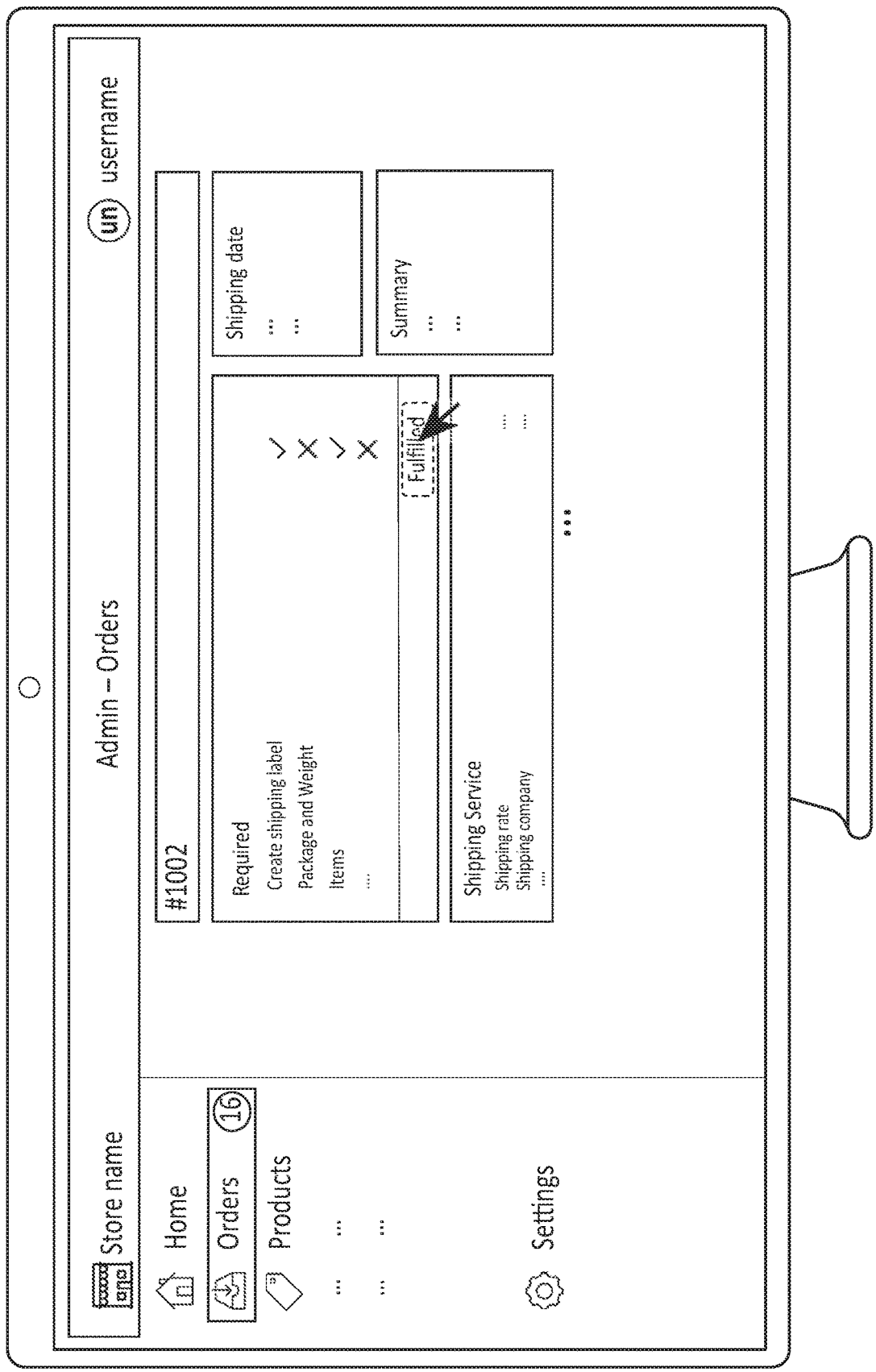

In a second possible example, based on the stored tracking information, the task-centric user interface determiner 308 determines a task-centric user interface layout for the navigation action "click on orders to fulfil" from within the landing user interface layout to be the user interface layout that contains the set of available fulfilment options for the next unfulfilled order, as depicted in FIG. 3J. In this case, it can be seen that the following steps are saved:
  Filter by "unfulfilled";
  Sort by date oldest to newest;
  Select oldest order; and
  Select "fulfil" to access fulfilment page.

What this means is that once a user performs the navigation action to access the list of orders, rather than simply going to the next user interface layout showing the navigation action, the system will immediately present the user with the customized task-centric user interface layout for performing fulfilment for the oldest unfulfilled order.

As noted above, the task-centric user interface layouts may be generated based on a single user's interactions with the system, or may be based on an aggregate of a set of user's interactions with the system. In some embodiments, the aggregation is role centric. In this case, each user is assigned a role within the system, and aggregation is only performed for interactions by users having the same role, or one of a set of roles. More generally, some basis for aggregation can be used. This may be as simple as an "aggregate" field associated with a given user. Information for all users with the "aggregate" field set to "yes" will be aggregated. Or there can be multiple different aggregate fields, and information for users with the same aggregate field are used. Other existing fields can be used for the "aggregate", such as organization, role, location, security clearance to name a few examples. Aggregation may be performed on a different basis for different tasks.

Probabilities associated with the previous recorded associations may be used to determine a task-centric user interface layout. Returning to the fulfilment example, if 80% of the time, after a user completes a fulfilment task, the user then goes on to perform another fulfilment task for the next order, and 20% of the time, the user does something else, the system may decide to present a user interface layout suitable for executing the fulfilment task for the next unfulfilled order in response to the user executing a fulfilment task. In some embodiments, a weighting is applied to the stored tracking information for example to give more weight to more recent interactions or to give more weight to that user's interactions than other users interactions.

Note that each of the steps taken by a user in the above example up to and not including the actual fulfilment step is a navigation action. So the list of navigation actions includes:
  Clicking on orders to fulfil
  Selecting filter by unfulfilled
  Select sort by date
  Select oldest unfulfilled order
  Select "fulfil" from order user interface layout
  The task ultimately performed is:
  Select "fulfilled" from fulfilment user interface layout It can be seen that the initial task/step is not specific to the fulfilment process, but is simply accessing the order summary user interface layout. However, the stored tracking information may show that for a given user, the user goes on to perform the further steps listed above associated with fulfilment, with some probability.

For example, an analysis may show probabilities of arriving at ultimate landing points for a given navigation action:
  Clicking on orders to fulfil: probability that the user will ultimately land on the fulfilment user interface layout for the next unfulfilled order via the process summarized above: 80%
  Clicking on orders to fulfil: probability that the user will ultimately land on some user interface layout unrelated to fulfilment: 10%
  Clicking on orders to fulfil: probability that the user will ultimately on the fulfilment user interface layout for the next unfulfilled order by a process different than summarized above: 10%.

This analysis can be done for each navigation action. A corresponding set of probabilities may be generated for the "selecting filter by unfulfilled" navigation action.

In the above example, the system takes the user directly to the fulfilment user interface layout for the next unfulfilled order by date, consistent with the significant probability that the user will ultimately land on the fulfilment user interface layout for the next unfulfilled order via the process summarized above.

However, the probabilities may show that just arriving at the orders user interface layout has a low probability of ultimately landing on the fulfilment user interface layout for the next unfulfilled order, but may show a much higher probability of ultimately landing on the fulfilment user interface layout for the next unfulfilled order after the user selects filter by unfulfilled. In this case, the system waits until the user selects filter by unfulfilled before taking the user directly to the fulfilment user interface layout for the next unfulfilled order sorted by date.

In this case, no task-centric user interface layout is generated for the step of accessing the orders user interface layout, but a task-centric user interface layout is determined for the step of filtering by unfulfilled.

In some embodiments, a threshold number of interactions must be reached before task-centric user interface layout determination. For the above example, if the threshold is set to 10, the user will not be presented with a task-centric user interface layout for fulfilling the next unfulfilled order by date, until they have interacted with the system 10 times to perform fulfilment. The threshold may be user specific, or applied to a set of aggregated interactions. The threshold may also be adjusted in relation to the number of times the user has interacted with the given user interface layout, e.g. if 5 out of 5 interactions with the order user interface layout follow an identical pattern, the proportion of interactions following the same task flow is 100% and the task-centric user interface layout may be generated earlier than the 10 threshold.

There will be times when a user is presented with such a task-centric user interface layout, but the user goes on to do something different necessitating further user input. Such an interaction will also be stored as part of the tracking information, and will affect the ongoing dynamic generation of the task-centric user interface layout.

Note that in some embodiments, the task-centric user interface layout is not any different from a layout that can be achieved by the user by performing a sequence of navigation actions. However, the task-centric user interface layout assumes that the user will perform those navigation actions, and in effect performs them automatically to present the end result. In some embodiments, the system may in fact perform the navigation actions sequentially in an automated fashion to get to the task-centric user interface layout. Alternatively, the system may be configured to jump to the end result.

Note there may be additional steps that affect the layout but are less obviously associated with the task being executed. These additional steps may also be tracked. For example, the user may maximize a display window every time they select "fulfil" from the order user interface layout. This information can also be stored in the tracking information and replicated in the task-centric user interface layout that is generated.

Application to "New" Users:

In some embodiments, when a new user that has never accessed the system (either at all, or to perform a specific task) starts performing tasks for which customized task-centric user interface layouts have been generated based on other user's interactions, the system provides the new user with the task-centric user interface layout determined based on other user's interactions so as to reduce the learning curve required to be able to access the appropriate contextual information to complete the tasks at hand without requiring a default set up.

In this case, it may be necessary to wait for the user to take one or more additional steps before presenting the task-centric user interface layout in order to increase the probability that the task-centric user interface layout in fact applies to what the user is about to do. For example, when a new user accesses an order summary user interface layout, it may not be immediately possible to conclude that user will be interested in fulfilling unfulfilled orders. However, once that user performs certain steps, the system can deduce that this is the case. Examples of situations where the system may make such a deduction:

if the user selects an unfulfilled order and takes steps to fulfil it, the system may immediately jump to presenting the next unfulfilled order by date;

if the user filters the order summary by "unfulfilled".

Revert Button

In some embodiments, a "revert" button (UI element) is presented to the user that, when selected, causes the system to present the default user interface layout that would have been presented but for the task-based layout automation. This allows the user to quickly get back to the default user interface layout when the task-based layout was not what the user was interested in. Use of the "revert" button may be stored in the tracking information, and can affect the future determination of task-centric user interface layouts.

The subject-matter of the present application may be employed in association with a variety of applications and in a variety of domains. As an example, the subject-matter of the present application may be employed for controlling and coordinating the execution of tasks in e-commerce platforms. As such, while e-commerce is merely an example application domain for the subject-matter of the present application, an example e-commerce platform will now be described with reference to FIGS. 4 and 5.

Figure 4:
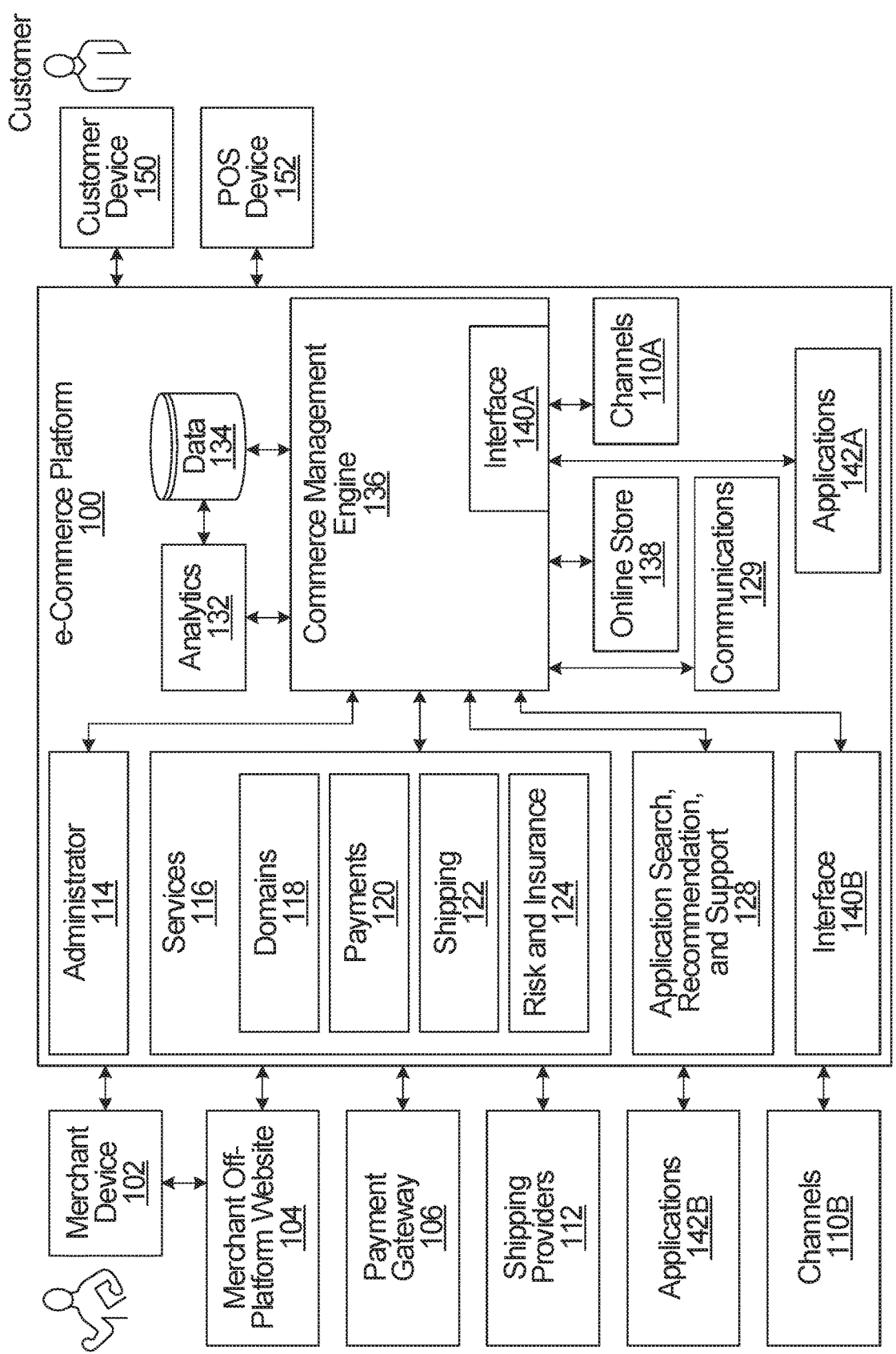
FIG. 4 is a block diagram of an e-commerce platform, according to one embodiment.

With reference to FIG. 4, an embodiment e-commerce platform 100 is depicted for providing merchant products and services to customers.

While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS device 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 5:
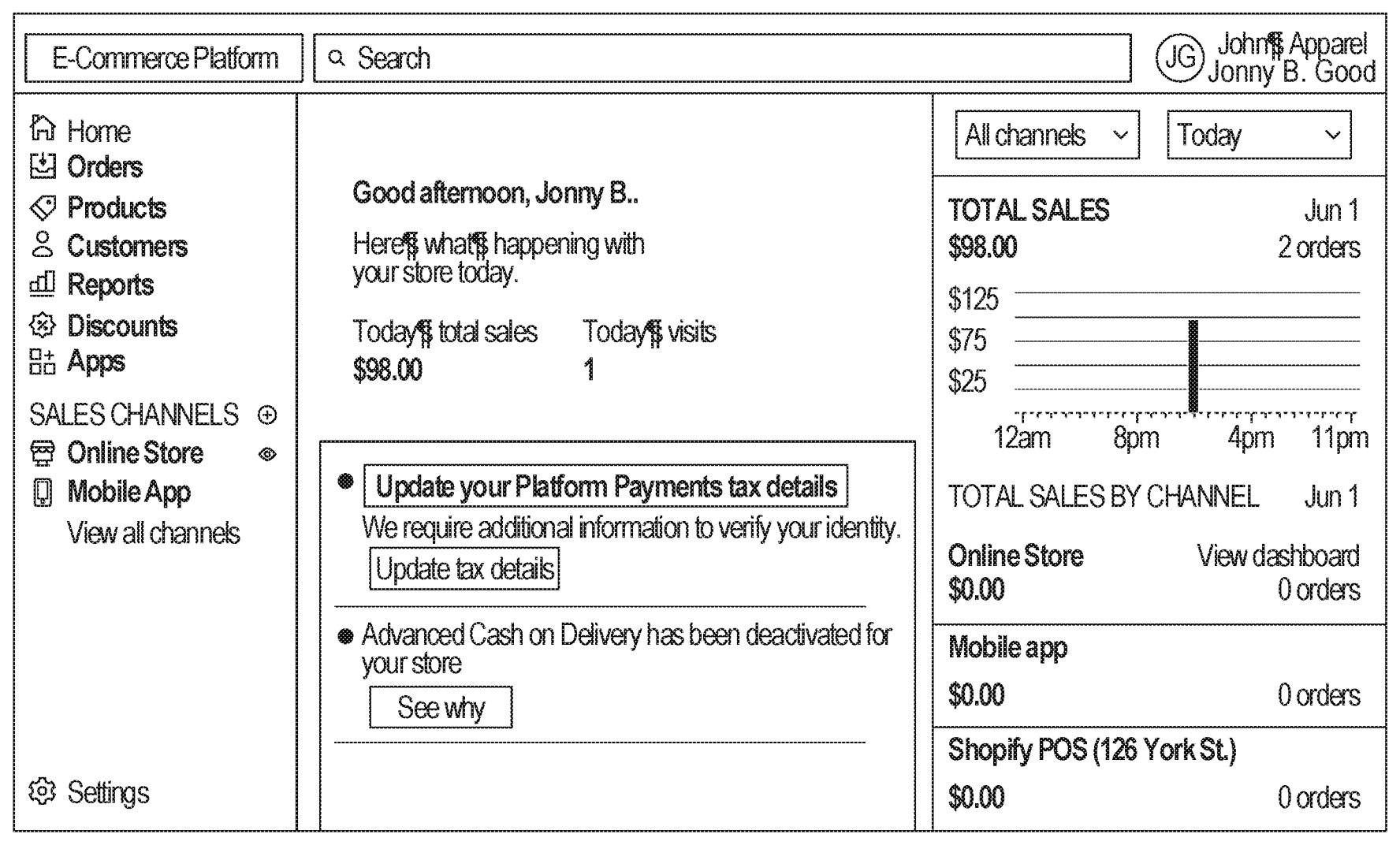

FIG. 5, which will be described with further reference to FIG. 1, depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 4 in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may make a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

The e-commerce platform 100 may be providing sales channels for multiple merchants, for their respective customers, and for varying types of merchandise. Payment gateways 106 are provided by the e-commerce platform or by external parties to process transactions in an e-commerce environment.

As mentioned above, the subject-matter of the present application may be employed in relation to an e-commerce platform such as the e-commerce platform 100 of FIG. 4. Put another way, in addition to the above-noted e-commerce capabilities, the e-commerce platform of FIG. 4 can also be configured to generate task-specific user interface layouts in accordance with the subject-matter of the present application. Specifically, the tracking information store, and layout tracker, and task-centric user interface determiner described herein may be implemented within the commerce management engine 136 of the depicted e-commerce platform 100. However, it should be understood that these features and, more broadly, the subject matter of the present application, is not limited in its application to the e-commerce platform of FIG. 4, or to e-commerce platforms generally. More generally, the methods described herein can find application in a system where users perform tasks repeatedly, and would benefit from the presentation of task-centric user interface layouts based on past user behaviour.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
  tracking a sequence of user interface layouts presented in the course of a first user performing a task, and creating an association for the task, the association being between the sequence of user interface layouts and detected navigation actions taken by the first user within those user interface layouts to perform the task, and storing the association in a database, wherein the performing the task includes making a change to stored application data;
  determining, based on the stored associations, a task-centric user interface layout for the first user, the task-centric user interface layout intended to ease performance of the task by bypassing at least one of the detected navigation actions, based on probabilities determined from the stored associations, by:
    based on the stored associations, for each detected action taken by the first user within a user interface layout of said sequence of user interface layouts, determining a probability that the first user will navigate to each other user interface layout of said sequence of user interface layouts, and
    determining the task-centric user interface layout based on the probabilities; and
  in response to detecting a navigation action associated with the first user within a user interface layout of the sequence of user interface layouts, providing the respective task-centric user interface layout for display.

2. The method of claim 1 wherein:
  determining the task-centric user interface layout for the given user is based only on the stored associations for that user.

3. The method of claim 1 further comprising:
  for each of at least one other user, tracking a sequence of user interface layouts presented in advance of the other user performing the task, and creating an association between the sequence of layouts and detected navigation actions taken by the other user within those user interface layouts, and storing the association in a database;
  wherein the determining the task-centric user interface layout for the first user is based on the stored associations for a set of users including the first user and the at least one other user.

4. The method of claim 3 wherein the set of users is defined based on one of or a combination of two or more of:
  organization;
  role;
  a field functioning as an aggregation tag; or
  location.

5. The method of claim 1 further comprising:
  based on the stored associations, for each detected action taken by the first user within said sequence of user interface layouts, determining a respective probability that the first user will navigate to a specific user interface layout within which the task can be performed;
  for each detected action taken by the first user within said sequence of user interface layouts, determining the task-specific user interface layout to be the specific user interface layout within which the task can be performed when the respective probability is greater than a threshold.

6. The method of claim 1 wherein:
  the task is a task within an E-commerce platform.

7. An apparatus comprising:
  a processor and a memory, the apparatus configured to perform a method comprising:
  tracking a sequence of user interface layouts presented in the course of a first user performing a task, and creating an association for the task, the association being between the sequence of user interface layouts and detected navigation actions taken by the first user within those user interface layouts to perform the task, and storing the association in a database, wherein the performing the task includes making a change to stored application data;
  determining, based on the stored associations, a task-centric user interface layout for the first user, the task-centric user interface layout intended to ease performance of the task by bypassing at least one of the detected navigation actions, based on probabilities determined from the stored associations by:
  based on the stored associations, for each detected action taken by the first user within a user interface layout of said sequence of user interface layouts, determining a probability that the first user will navigate to each other user interface layout of said sequence of user interface layouts, and determining the task-centric user interface layout based on the probabilities; and in response to detecting a navigation action associated with the first user within a user interface layout of the sequence of user interface layouts, providing the respective task-centric user interface layout for display.

8. The apparatus of claim 7 wherein the apparatus is configured to determine the task-centric user interface layout for the given user based only on the stored associations for that user.

9. The apparatus of claim 7 further configured to:

for each of at least one other user, tracking a sequence of user interface layouts presented in advance of the other user performing the task, and creating an association between the sequence of layouts and detected navigation actions taken by the other user within those user interface layouts, and storing the association in a database;

wherein the apparatus is configured to determine the task-centric user interface layout for the first user based on the stored associations for a set of users including the first user and the at least one other user.

10. The apparatus of claim 9 wherein the set of users is defined based on one or a combination of:
organization;
role;
a field functioning as an aggregation tag; or
location.

11. The apparatus of claim 7 further configured to:

based on the stored associations, for each detected action taken by the first user within said sequence of user interface layouts, determining a respective probability that the first user will navigate to a specific user interface layout within which the task can be performed;

for each detected action taken by the first user within said sequence of user interface layouts, determining the task-specific user interface layout to be the specific user interface layout within which the task can be performed when the respective probability is greater than a threshold.

12. The apparatus of claim 7 wherein:
the apparatus is implemented within an E-commerce platform.

13. A computer readable medium having computer executable instructions stored thereon that when executed by a computer cause the computer to perform a method comprising:

tracking a sequence of user interface layouts presented in the course of a first user performing a task, and creating an association for the task, the association being between the sequence of user interface layouts and detected navigation actions taken by the first user within those user interface layouts to perform the task, and storing the association in a database, wherein the performing the task includes making a change to stored application data;

determining, based on the stored associations, a task-centric user interface layout for the first user, the task-centric user interface layout intended to ease performance of the task by bypassing at least one of the detected navigation actions, based on probabilities determined from the stored associations, by:

based on the stored associations, for each detected action taken by the first user within a user interface layout of said sequence of user interface layouts, determining a probability that the first user will navigate to each other user interface layout of said sequence of user interface layouts, and determining the task-centric user interface layout based on the probabilities; and in response to detecting a navigation action associated with the first user within a user interface layout of the sequence of user interface layouts, providing the respective task-centric user interface layout for display.

14. The computer readable medium of claim 13 wherein:
determining the task-centric user interface layout for the given user is based only on the stored associations for that user.

15. The computer readable medium of claim 13 wherein the method further comprises:

for each of at least one other user, tracking a sequence of user interface layouts presented in advance of the other user performing the task, and creating an association between the sequence of layouts and detected navigation actions taken by the other user within those user interface layouts, and storing the association in a database;

wherein the determining the task-centric user interface layout for the first user is based on the stored associations for a set of users including the first user and the at least one other user.

16. The computer readable medium of claim 15 wherein the set of users is defined based on one or a combination of:
organization;
role;
a field functioning as an aggregation tag; or
location.

* * * * *